(12) United States Patent
Senoo et al.

(10) Patent No.: US 8,328,915 B2
(45) Date of Patent: Dec. 11, 2012

(54) DEHUMIDIFYING DEOXIDIZER

(75) Inventors: Yuichi Senoo, Ageo (JP); Kazuya Kinoshita, Ageo (JP); Isamu Yashima, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 510 days.

(21) Appl. No.: 12/302,835

(22) PCT Filed: Jun. 26, 2007

(86) PCT No.: PCT/JP2007/062750
§ 371 (c)(1),
(2), (4) Date: Nov. 28, 2008

(87) PCT Pub. No.: WO2008/001745
PCT Pub. Date: Jan. 3, 2008

(65) Prior Publication Data
US 2009/0246556 A1 Oct. 1, 2009

(30) Foreign Application Priority Data

Jun. 29, 2006 (JP) .................. 2006-179857
Jun. 14, 2007 (JP) .................. 2007-157979

(51) Int. Cl.
*B01D 53/02* (2006.01)
(52) U.S. Cl. ................ 96/132; 95/117; 95/138; 96/134; 96/154
(58) Field of Classification Search .............. 95/117; 428/702; 252/194; 206/557
See application file for complete search history.

(56) References Cited

U.S. PATENT DOCUMENTS

| | | | | | |
|---|---|---|---|---|---|
| 4,885,145 | A | * | 12/1989 | Kay et al. | 423/230 |
| 5,837,642 | A | * | 11/1998 | Tanaka et al. | 502/304 |
| 6,475,949 | B1 | * | 11/2002 | Yamaguchi et al. | 502/304 |
| 6,831,036 | B1 | * | 12/2004 | Yamazaki et al. | 502/327 |
| 2004/0186016 | A1 | | 9/2004 | Bog et al. | |

FOREIGN PATENT DOCUMENTS

| | | |
|---|---|---|
| JP | 2000-72437 | 3/2000 |
| JP | 2004-337840 | 12/2004 |
| JP | 2005-104064 | 4/2005 |
| JP | 2005-105195 | 4/2005 |
| WO | WO 2005/070832 | 8/2005 |
| WO | WO 2005/088298 | 9/2005 |

OTHER PUBLICATIONS

Translation of JP 2005-105195 A (Toppan Printing Co., Ltd.), Apr. 21, 2005.*
Translation of JP 2004-337840 A (Umicore AG & Co. KG), Dec. 2, 2004.*
Translation of JP 2005-104064 A, Suzuta et al, Apr. 21, 2005.*

* cited by examiner

*Primary Examiner* — Duane Smith
*Assistant Examiner* — Christopher P Jones
(74) *Attorney, Agent, or Firm* — Young & Thompson

(57) ABSTRACT

A dehumidifying deoxidizer containing oxygen-deficient cerium oxide and a dehumidifier is provided. The oxygen-deficient cerium oxide is preferably doped with an element increasing the oxygen absorption of the cerium oxide. The oxygen absorption sites of the cerium oxide are preferably obstructed by a site obstructing factor. The cerium oxide preferably has a fluorite type superlattice structure. Also provided are a dehumidifying and deoxidizing packet having the dehumidifying deoxidizer sealed in a bag-shaped, gas permeable casing and a dehumidifying and deoxidizing resin composition containing the dehumidifying deoxidizer and a gas permeable resin.

19 Claims, 3 Drawing Sheets

DEHUMIDIFYING DEOXIDIZER

TECHNICAL FIELD

This invention relates to a dehumidifying deoxidizer that removes moisture and oxygen from the surrounding atmosphere. The invention also relates to a dehumidifying and deoxidizing packet, a dehumidifying and deoxidizing resin composition, and a dehumidifying and deoxidizing laminate film each containing the dehumidifying deoxidizer.

BACKGROUND ART

To cope with the recent strong demand for safety and quality maintenance of foods, it has been a practice to make the inner atmosphere of food packages oxygen-free to minimize deterioration of foods by oxidation. More specifically, a deoxidizer that absorbs oxygen in the environment is co-packaged with a food so that the deoxidizer removes residual oxygen inside the package thereby to make the inner atmosphere oxygen-free. Furthermore, co-packaging a food and a deoxidizer is carried out in an oxygen-free inert gas atmosphere so as to prevent oxygen entrapment into the package, and a trace amount of oxygen that may penetrate through the packaging material is removed by the co-packaged deoxidizer.

Known deoxidizers used to remove oxygen in an environment include organic materials and inorganic materials. Iron-based deoxidizers, which are inorganic materials, are predominant from the economical standpoint. Iron-based deoxidizers react with environmental oxygen and a trace amount of water in the environment according to chemical formula (1) below thereby to remove oxygen from the environment.

$$Fe + 1/2 H_2O + 3/4 O_2 \rightarrow FeOOH \quad (1)$$

Use of conventional iron-based deoxidizers as described involves the following problems.

(1) Since they need the presence of water in reacting with oxygen, a moisture retaining agent may be incorporated. Such a deoxidizer releases moisture to increase the humidity in the package. Therefore, when, for example, a tablet is sealed in an air-tight bag made of gas barrier film, a dehumidifier, e.g., silica gel should be co-packaged in some cases in order to maintain the dry state in the package. In such cases, the step of sealing a tablet requires means for putting a deoxidizer and means for putting a dehumidifier, which complicates the step. Moreover, removal of moisture from inside the bag with a dehumidifier reduces the water content necessary to induce the oxidation reaction, resulting in reduction of the deoxidizing function of the deoxidizer.

(2) Co-packaging a moisture-retaining agent is not permitted in sealing a pharmaceutical, supplement, or other tablet that must be maintained in a highly moisture-free environment. So, oxidation promotion by moisture represented by formula (1) above is not expected, and the deoxidizing function is not fully exerted. As a result, a larger amount of iron powder than usual would be needed. The same problem also arise in sealing and storing other products than pharmaceutical or supplement tablets that should be stored in the absence of moisture, such as dry foods, electronic components, and solder powder.

(3) When a food package having a food and an iron-based deoxidizer co-packaged is inspected for the presence of foreign matter such as metal, the iron powder of the deoxidizer would set off a metal detector, providing a hindrance to carrying out simple inspection.

(4) An iron-based deoxidizer can heat up abruptly and ignite when microwaved, e.g., in a microwave oven.

Deoxidizers based on inorganic oxides having been subjected to a reduction treatment have been proposed in place of the iron-based deoxidizers. For example, Patent Document 1 and Patent Document 2 disclose titanium dioxide, zinc oxide, and cerium oxide as exemplary inorganic oxides having been subjected to a reduction treatment. These inorganic oxides are used in combination with an organic or inorganic compound capable of retaining moisture. On releasing moisture, the organic or inorganic compound capable of retaining moisture serves as a trigger for the inorganic oxide having been subjected to a reduction treatment to absorb oxygen. In order words, the deoxidizer according to the patent documents supra needs the presence of moisture in the environment to cause the inorganic oxide having been subjected to a reduction treatment to absorb oxygen, with no considerations given to dehumidification of the environment. In fact, titanium dioxide, zinc oxide, cerium oxide, and the like do not perform sufficient dehumidifying function in terms, e.g., of rate of dehumidification and the lowest possible humidity when used alone.

Patent Document 1 JP 2005-104064A
Patent Document 2 JP 2005-105195A

DISCLOSURE OF THE INVENTION

An object of the present invention is to provide a deoxidizer that eliminates the problems associated with the above described conventional techniques.

The invention provides a dehumidifying deoxidizer containing oxygen-deficient cerium oxide and a dehumidifier.

The invention also provides a dehumidifying and deoxidizing method, in which oxygen and moisture are removed from the surrounding atmosphere by using the dehumidifying deoxidizer of the invention.

The invention also provides a dehumidifying and deoxidizing packet including a gas permeable casing of bag shape and the above described dehumidifying deoxidizer sealed in the casing.

The invention also provides a dehumidifying and deoxidizing resin composition containing the above described dehumidifying deoxidizer and a gas permeable resin.

The invention also provides a dehumidifying and deoxidizing laminate film comprising a dehumidifying and deoxidizing layer having the above dehumidifying and deoxidizing resin composition according, a gas barrier layer which has gas barrier properties and is superposed on one side of the dehumidifying and deoxidizing layer, and a gas permeable layer which has gas permeability and is superposed on the other side of the dehumidifying and deoxidizing layer.

BEST MODE FOR CARRYING OUT THE INVENTION

Figure 1:
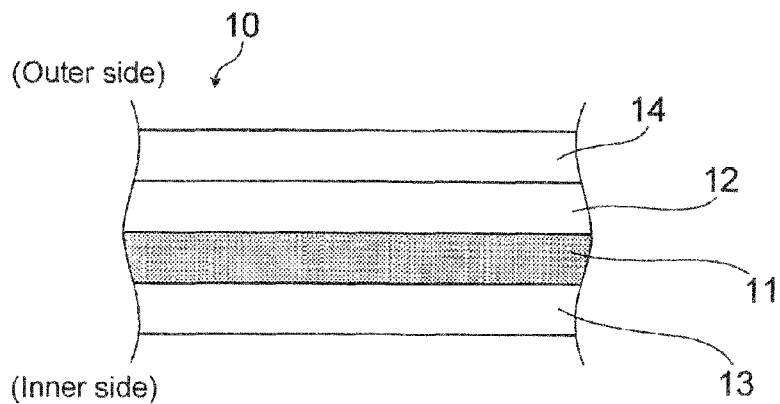
FIG. 1 illustrates an embodiment of the dehumidifying and deoxidizing laminate film according to the invention.

The present invention will be described in detail with reference to its preferred embodiments. The dehumidifying deoxidizer of the present invention comprises oxygen-deficient cerium oxide and a dehumidifier. In what follows, the term "cerium oxide" is meant to refer to oxygen-deficient (substoichiometric) cerium oxide and stoichiometric cerium oxide, which depends on the context. Oxygen-deficient cerium oxide and the dehumidifier are generally used in powder form. In some cases, they are used in the form of a formed body obtained by, for example, pressing.

Cerium oxide having an oxygen vacancy is represented by general formula $CeO_{2-x}$, wherein x is a positive number, preferably 1 or smaller, more preferably 0.7 or smaller. While cerium oxide ($CeO_2$) takes on a fluorite type crystal structure, oxygen-deficient cerium oxide, when allowed to stand in an oxygen-containing environment, takes up oxygen in the environment into its crystal lattice. Furthermore, cerium oxide allows oxygen to enter deep inside because it has high oxygen ion conductivity. Therefore, cerium oxide exhibits good oxygen absorption capability to eliminate oxygen from the environment. Existence of water in the environment is not needed for this. Thus, unlike conventional iron-based deoxidizers, a deoxidizer containing cerium oxide is especially effective for deoxidization of articles that must be kept moisture-free.

Oxygen-deficient cerium oxide is obtainable by heating stoichiometric cerium oxide ($CeO_2$) at high temperature in a reducing atmosphere, such as hydrogen gas, to remove oxygen from the crystal lattice.

The present inventors' study has revealed that cerium oxide exhibits not only deoxidizing ability but also dehumidifying ability. When placed in an environment, cerium oxide removes moisture as well as oxygen existing in the environment. This is extremely advantageous in storing articles that must be kept in a highly moisture-free environment. As a result of further investigation, however, the inventors have found that cerium oxide reduces its dehumidifying ability when placed in a high humidity environment. For the purpose of preventing the reduction of dehumidifying ability, the cerium oxide is used in combination with a dehumidifier in the present invention. The combined use prevents cerium oxide placed under a high humidity condition from reducing its dehumidifying ability. Understandably, the dehumidifying effect produced by the combined use is greatly enhanced as compared when cerium oxide is used alone.

Taking into consideration a good balance between dehumidifying ability and deoxidizing ability, the proportion of cerium oxide in the dehumidifying deoxidizer of the invention is preferably 50% to 99%, more preferably 60% to 85%, by weight based on the total weight of cerium oxide and the dehumidifier. The proportion of the dehumidifier is preferably 1% to 50%, more preferably 15% to 40%, by weight based on the total weight of the cerium oxide and the dehumidifier.

As stated above, cerium oxide and the dehumidifier are generally used in the form of powder. The particle sizes of these powders are chosen as appropriate to the shape of the dehumidifying deoxidizer to be produced. For instance, where the dehumidifying deoxidizer is to be supplied in the form of a packet, being sealed in a bag-shaped, gas permeable casing, the particle sizes of cerium oxide and of the humidifier are not particularly limited for the following reasons. (1) Since cerium oxide has high oxygen ion conductivity, it exhibits high rate of oxygen absorption irrespective of the particle size. (2) While a dehumidifier with a smaller particle size and a larger specific surface area exhibits a higher rate of dehumidification, sufficient dehumidification rate is secured even with a relatively large particle size. Generally speaking, cerium oxide and the dehumidifier preferably have an average particle size of 0.1 to 100 μm and 0.1 μm to 1 mm, respectively. Where the dehumidifying deoxidizer is formulated into film of a gas permeable resin composition, it is preferred that the particle sizes of the cerium oxide and the dehumidifier do not exceed the film thickness. In this regard, the average particle sizes of the cerium and the dehumidifier are preferably 0.01 to 20 μm, more preferably 0.01 to 10 μm. The average particle size as referred to in the present invention are measured with a laser diffraction scattering particle size analyzer.

In the dehumidifying deoxidizer of the invention, the cerium oxide and the dehumidifier are usually used as a mixed powder. As the case may be, cerium oxide and a dehumidifier are separately disposed in different sections of a holder.

Any available dehumidifier capable of removing moisture from a surrounding environment, either organic or inorganic, can be used in the invention with no particular restriction. Examples of inorganic dehumidifiers include naturally occurring zeolite species, such as mordenite, clinoptilolite, and erionite; synthetic zeolite, such as molecular sieve; clay minerals, such as bentonite and montmorillonite; silica gel, alumina, calcium oxide, and hygroscopic salts. Examples of organic dehumidifiers include pulp, pulp-containing paper, poly($\alpha,\beta$-unsaturated carboxylic acids), ion-crosslinked poly ($\alpha,\beta$-unsaturated carboxylic acids), ethylene-vinyl acetate copolymer partial/complete saponification products, partial/complete saponification products of polyvinyl acetate, cellulosic derivatives, polyalkylene oxide derivatives, polyesters, and polyamides.

Among these dehumidifiers preferred are clay minerals for their large moisture absorption capacity per unit weight, high hygroscopicity under a low humidity condition, chemical stability, and safety (non-exothermic and non-toxic).

The dehumidifying deoxidize of the invention may be sealed into a bag-shaped, gas-permeable casing to provide a dehumidifying and deoxidizing packet. The dehumidifying deoxidizer in the packet is a mixture of cerium oxide powder and dehumidifier powder or, as alluded to above, is a combination of cerium oxide powder and dehumidifier powder separately sealed in different sections of a holder. The dehumidifying and deoxidizing packet is used as sealed in a package together with, for example, a dry food or a tablet.

As used herein, the term "gas permeable" refers to having permeability to at least oxygen and moisture. Examples of gas permeable materials making the casing include polypropylene, polybutadiene, polymethylpentene, thermoplastic elastomers, and thermoplastic resins, such as polyethylene terephthalate, silicone resins, ethylene-vinyl acetate copolymers, polybutadiene, polyisoprene, low-density polyethylene, medium-density polyethylene, propylene-ethylene copolymers, propylene-ethylene random copolymers, and ethylene-$\alpha$-olefin copolymers.

The dehumidifying deoxidizer of the present invention may be mixed with the above recited gas-permeable resin to provide a dehumidifying and deoxidizing resin composition. The resin composition may have for example the form of pellets as be a molding material for providing various resin molded article. The resin composition may also have the form of various molded articles, such as a film and a tray, as obtained from the pellets. Whatever form the resin composition may take on, the proportion of the dehumidifying deoxidizer in the resin composition is preferably 10% to 90%, more preferably 20% to 80%, by weight, to perform sufficient dehumidifying and deoxidizing function. In terms of strength and moldability of the resin composition, the proportion of the resin in the resin composition is preferably 10% to 90%, more preferably 20% to 80%, by weight.

In the cases where the resin composition is used in film form, the thickness of the film is preferably 1 to 100 μm, more preferably 20 to 40 μm, while depending on the intended use. If desired, the resin composition of any form including film form may contain other components effective in improving the characteristics of the resin composition in addition to the dehumidifying deoxidizer and the gas permeable resin. Such other components include pigments for coloring the resin composition in a prescribed color and fillers for increasing the strength of the resin composition.

The film made of the dehumidifying and deoxidizing resin composition may be used either alone (as a single layered structure) or as a layer of a multilayered structure. In the latter case, the multilayered structure is exemplified by a dehumidifying and deoxidizing laminate film composed of a dehumidifying/deoxidizing layer made of the above described dehumidifying and deoxidizing resin composition, a gas barrier layer having gas barrier properties superposed on one side of the dehumidifying/deoxidizing layer, and a gas permeable layer having gas permeability superposed on the other side of the dehumidifying/deoxidizing layer. Such a dehumidifying and deoxidizing laminate film is used with its gas barrier layer facing outside (namely, to the atmosphere), and its gas permeable layer facing inside (namely, to the environment from which moisture and oxygen should be removed).

An embodiment of the dehumidifying and deoxidizing laminate film is illustrated in FIG. 1. The dehumidifying and deoxidizing laminate film 10 of FIG. 1 has a dehumidifying/deoxidizing layer 11 made of the dehumidifying and deoxidizing resin composition. In planar contact with one side of the dehumidifying/deoxidizing layer 11 is provided a gas barrier layer 12. In planar contact with the other side of the dehumidifying/deoxidizing layer 11 is provided a gas permeable layer 13. In contact with the outer side of the gas barrier layer 12 is provided a protective layer 14 for the protection of the gas barrier layer 12.

The gas barrier layer 12 used in the dehumidifying and deoxidizing laminate film 10 shown in FIG. 1 is a layer blocking penetration of at least oxygen and moisture. Examples of materials for making the gas barrier layer 12 include aluminum foil, polyvinyl alcohol, polyvinylidene chloride-coated oriented nylon (commercial product), a terephthalic acid/trimethylhexamethylenediamine polycondensate, a 2,2-bis(p-aminocyclohexyl)propane-adipic acid copolymer, an ethylene/vinyl alcohol copolymer, polyvinyl chloride, Nylon MXD (trade name), Nylon 6 (trade name), and Nylon 6,6 (trade name).

The gas permeable layer 13 used in the dehumidifying and deoxidizing laminate film 10 shown in FIG. 1 is a layer permeable to at least oxygen and moisture. Examples of materials for making the gas permeable layer 13 include nonwoven fabric, polyethylene (including low-density polyethylene and ultra-low-density polyethylene), oriented polypropylene (PP), polypropylene, an ethylene-propylene copolymer, ethylene propylene rubber, and an ethylene-ethyl acrylate copolymer.

Examples of the material used to make the protective layer 14 of the dehumidifying and deoxidizing laminate film 10 include polyethylene, polypropylene, polyethylene terephthalate (PET), and polyamide.

Figure 2:
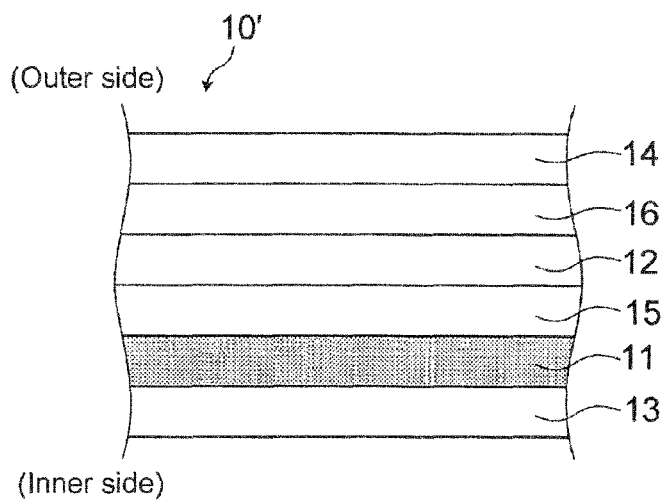
FIG. 2 illustrates another embodiment of the dehumidifying and deoxidizing laminate film according to the invention.

Another embodiment of the dehumidifying and deoxidizing laminate film is illustrated in FIG. 2. The laminate film 10' of FIG. 2 has additional layers in addition to the layer structure shown in FIG. 1. More specifically, the laminate film 10' has a buffer layer 15 between the dehumidifying/deoxidizing layer 11 and the gas barrier layer 12 and a high gas barrier layer 16 on the outer side of the gas barrier layer 12, i.e., between the gas barrier layer 12 and the protective layer 14.

The buffer layer 15 of the dehumidifying and deoxidizing laminate film 10' shown in FIG. 2 serves the function of buffering a physical impact from the outside. Materials used to make the buffer layer 15 include polyethylene and polypropylene.

The high gas barrier layer 16 of the dehumidifying and deoxidizing laminate film 10' shown in FIG. 2 is a layer having higher ability to block the penetration of oxygen and moisture than the gas barrier layer 12. Materials used to make the high gas barrier layer 16 include foil of various metals, such as aluminum foil, vacuum deposited film of various metals, such as aluminum, and vacuum deposited film of various oxides, e.g., silica, titania, zirconia, and alumina.

The six-layered dehumidifying and deoxidizing laminate film 10' illustrated in FIG. 2 exhibits improved buffering action against physical impact applied to the film from the outside and, at the same time, provides a further ensured barrier against gas permeation from the outside as compared with the dehumidifying and deoxidizing laminate film 10 of FIG. 1. Thus, the dehumidifying and deoxidizing laminate film 10' illustrated in FIG. 2 has a higher value than the dehumidifying and deoxidizing laminate film 10 of FIG. 1.

The cerium oxide that can be used in the dehumidifying deoxidizer of the present invention will be described in detail. The cerium oxide that can be used in the dehumidifying deoxidizer of the invention may be doped with a dopant element that increases the oxygen absorption of the cerium oxide. A dopant element is added and substitutionally dissolved in cerium oxide to make a composite oxide having a greatly increased oxygen absorption. The dopant element is preferably at least one of magnesium (Mg), calcium (Ca), strontium (Sr), barium (Ba), lanthanum (La), niobium (Nb), praseodymium (Pr), and yttrium (Y). Preferred of them are yttrium (Y), calcium (Ca), and praseodymium (Pr); for they bring about more enhanced oxygen absorption.

The mechanism of the oxygen absorption enhancement by the doping with the above recited dopant elements is as follows. Cerium in cerium oxide is usually tetravalent but changes its valency to trivalent on being reduced in high temperature. The ionic radius of cerium oxide expands with the change of valency number, and the crystal lattice itself expands. As a result, the structure becomes instable. Because the recited elements have a smaller ionic radius than the expanded, trivalent cerium ion, addition of any of them is effective in controlling the expansion of the crystal lattice. As a result, more oxygen vacancies can be retained, which leads to an increased oxygen absorption capacity.

The total amount of the dopant elements to be added is preferably 1 to 20 mol % based on Ce atom to increase the oxygen absorbing ability of cerium oxide stably.

The cerium oxide having the dopant element substitutionally dissolved therein can easily be produced by, for example, firing powder of a composite oxide of cerium and a dopant element at 1400° C. or higher temperatures in the atmosphere for about 1 hour, and further firing the product in a reducing gas (e.g., hydrogen) stream at 1000° C. for 1 hour.

Having oxygen vacancies, the cerium oxide used in the dehumidifying deoxidizer of the invention has oxygen absorption sites caused by the oxygen vacancies. It is preferred that the oxygen absorption sites are releasably obstructed by a site obstructing factor, whereby the cerium oxide may have controlled oxygen absorption activity. The more the sites obstructed by the obstructing factor, the lower the activity. This means that the time of handling the dehumidifying deoxidizer is controllable. Handling time controllability imparts freedom of time setting in carrying out the step of sealing the dehumidifying deoxidizer into a packet or a package together with a product, such as a dry food or a tablet.

Figure 3:
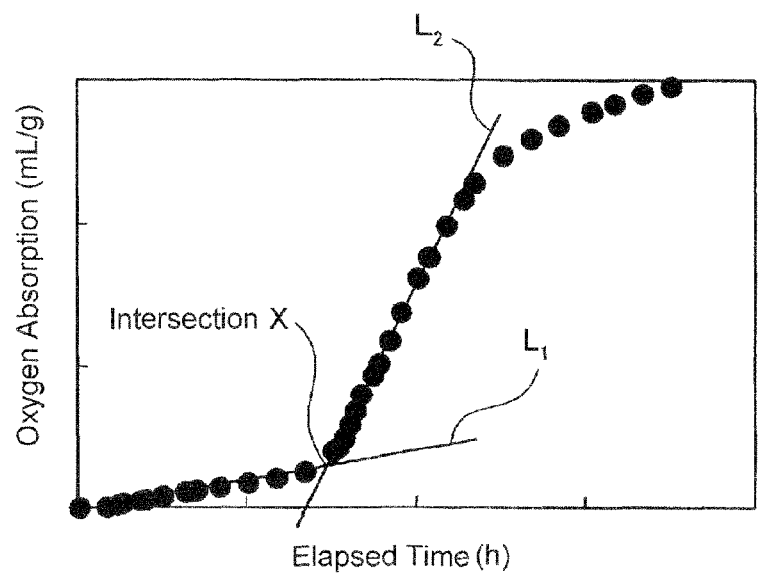
FIG. 3 is a diagram representing the relation between oxygen absorption vs. time, used to define handling time.

The term "handling time" as used herein is defined as follows. In the relation between oxygen absorption (mL/g) vs. time (h) as graphically shown in FIG. 3, the dehumidifying deoxidizer starts absorbing oxygen immediately after release from a hermetic state and describes a slow oxygen absorption line (L1) and then abruptly absorbs oxygen, describing a steep oxygen absorption line (L2). The handling time is defined to be the time from the start of oxygen absorption to intersection X between the lines L1 and L2. It is said that it usually suffices for there to be about 1 to 2 hours as a handling time. After an elapse of the handling time, the oxygen absorption rate abruptly increases to perform the function as a deoxidizer.

An exemplary and preferred site obstructing factor is a substance having a carbonyl group. A site obstructing factor covers the surface of cerium oxide to hinder oxygen attack on cerium oxide, and the oxygen absorption activity of cerium oxide is reduced as a result. The site obstructing factor releases from the surface of cerium oxide with time. Eventually, the oxygen absorption sites are exposed to the surrounding atmosphere and start taking up oxygen.

Examples of a substance having a carbonyl group include (a) carbon dioxide, (b) acetaldehyde and its analogues having other than a methyl group (e.g., an alkyl group other than a methyl group) in place of the methyl group, (c) acetone and ketones having other than a methyl group (e.g., an alkyl group other than a methyl group) in place of the methyl group of acetone, (d) methyl acetate and esters having other than a methyl group (e.g., an alkyl group other than a methyl group) in place of the methyl group of methyl acetate, (e) acetic acid and carboxylic acids having other than a methyl group (e.g., an alkyl group other than a methyl group) in place of the methyl group of acetic acid, and (f) ethanamide and amides having other than a methyl group (e.g., an alkyl group other than a methyl group) in place of the methyl group of ethanamide.

In using carbon dioxide as a site obstructing factor, for instance, releasable obstruction of the oxygen absorption site of cerium oxide is preferably achieved as follows. Cerium oxide is heated to a prescribed temperature in a carbon dioxide atmosphere. The heating conditions are: 50° C. and 3 hours or longer; 100° C. to 200° C. and 2 hours or longer; 250° C. to 300° C. for 5 minutes or longer; 400° C. for 0.5 to 2 hours; or 500° C. for 30 minutes. In using a site obstructing factor other than carbon dioxide, when the site obstructing factor is not gaseous at ambient temperature, it is vaporized by heating, and the vapor is introduced into the oxygen absorption sites of cerium oxide.

Figure 4:
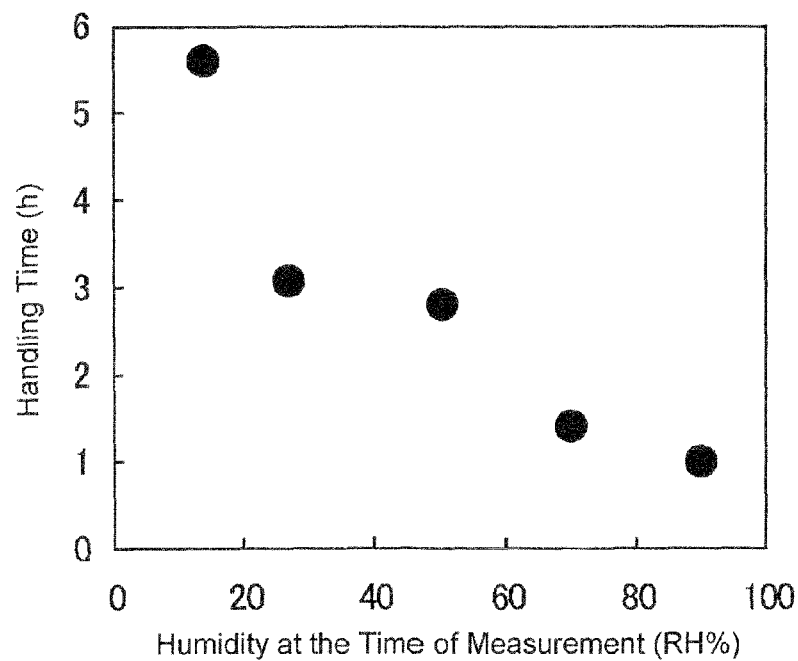
FIG. 4 is a diagram showing the relation between environmental humidity vs. handling time.

The combined use of the humidifier allows for controlling the cerium oxide handling time by the site obstructing factor in a more precise manner for the following reason. Some of the dehumidifiers that can be used in the invention have the ability to adsorb or absorb a site obstructing factor. For example, when carbon dioxide as a site obstructing factor is combined with calcium oxide or naturally occurring zeolite as a dehumidifier, it reacts with calcium to yield calcium carbonate, which is absorbed by calcium oxide, or it is adsorbed by zeolite. As a result, release of carbon dioxide from the surface of cerium oxide is accelerated, leading reduction of the handling time. When cerium oxide having been treated with a site obstructing factor is combined with a dehumidifier having no ability to adsorb or absorb the site obstructing factor, the handling time for the cerium oxide is extended for the following reason. As shown in FIG. 4, the cerium oxide handling time is correlated with the humidity of the surrounding atmosphere. The lower the humidity, the longer the handling time. A dehumidifier with no ability to adsorb or absorb the site obstructing factor dehumidifies the environment without accelerating the release of the site obstructing factor from the surface of cerium oxide. The relation between the cerium oxide handling time and the humidity of the environment as shown in FIG. 4 is a fact discovered by the inventors for the first time. Hence, proper selection of the dehumidifier to be combined makes it possible to control the cerium oxide handling time more precisely.

As previously discussed, the cerium oxide used in the dehumidifying deoxidizer of the invention takes on a fluorite structure and has oxygen vacancies. The inventors' investigation has revealed that, when cerium oxide has a fluorite type superlattice structure, it is capable of stably retaining a large amount of oxygen vacancies and thereby exhibits further improved oxygen absorbing ability. The cerium oxide having this structure is structurally stable to hold oxygen deficiencies in a stable manner because of its fluorite type structure in spite of its superlattice structure. Furthermore, it has high oxygen ion conductivity to allow oxygen to enter deep inside the crystal because of its fluorite type structure. As a result, the oxygen absorbing ability increases as compared with oxygen-deficient cerium oxide obtained by conventional techniques.

Since ordinary cerium (Ce) is tetravalent or trivalent, when tetravalent cerium oxide ($CeO_2$), which has two $O^{2-}$ per $Ce^{4+}$, is reduced, the resultant trivalent cerium oxide has one and a half $O^{2-}$ per $Ce^{3+}$. Accordingly, the maximum oxygen absorption per gram is calculated to be 34 ml/g. On the other hand, since cerium oxide having a fluorite type superlattice structure takes on a stable structure with a long period, from which oxygen vacancies are produced, it has a higher oxygen absorption than ordinary cerium oxide, namely, over 34 ml/g as calculated. Concomitantly, the cerium oxide having a fluorite type superlattice structure exists in an abnormal valence state such that part of cerium has a valence of 2 or less.

Cerium oxide having a fluorite type superlattice structure is obtained by, for example, subjecting cerium carbonate as a starting material directly to a high temperature reduction treatment. That is, cerium oxide having a fluorite type superlattice structure is obtained directly from cerium carbonate without involving the step of once oxidizing cerium carbonate to obtain cerium oxide, which is then subjected to high-temperature reduction.

The high temperature reduction is preferably carried out at 900° C. or higher for about 2.5 hours, at 1000° C. or higher for about 2 hours, or at 1050° C. or higher for about 1 hour. A higher reduction temperature is more advantageous for accelerated reduction and can be, for example, 1200° C. or higher, more preferably 1400° C. or higher. For industrial scale production, temperatures around 1050° C. are preferred.

Since the oxygen supply source is only the oxygen of the carbonate group, the starting material is fired in an oxygen starved atmosphere to create a superlattice structure containing a very large amount of oxygen vacancies. Thus, the resulting cerium oxide exhibits markedly increased oxygen absorbing capacity compared with the one obtained by reduction firing cerium oxide derived from cerium carbonate. The cerium oxide having a fluorite type superlattice structure is accordingly represented by $CeO_{2-x}$ (where x is 0.5 or greater and smaller than 1).

While the invention has been described with reference to its preferred embodiments, the invention is not construed as being limited to these embodiments. For example, the cerium oxide used in the dehumidifying deoxidizer of the invention may have any two or more of the following characteristics: (1) being doped with a dopant element increasing the oxygen absorption of cerium oxide, (2) having the oxygen absorption sites thereof releasably obstructed with a site obstructing factor, and (3) having a fluorite type superlattice structure.

The present invention will now be illustrated in greater detail by way of Examples, but it should be understood that the invention is not deemed to be limited thereto.

EXAMPLES 1 to 4

A solution of 75 g of ammonium hydrogencarbonate in 500 ml of water was prepared. To the aqueous solution was added dropwise 500 ml of a 0.1M cerium nitrate aqueous solution while stirring to conduct back neutralization. The precipitate thus formed was washed twice with ion-exchanged water and filtered to give cerium carbonate.

The resulting cerium carbonate octahydrate weighing 81.57 g and 3 g of calcium carbonate were mixed. The mixture was reduced in a 100% hydrogen flow (400 SCCM) at 1050° C. for 1 hour to obtain oxygen-deficient cerium oxide. The cerium oxide was found to have a Ca content of 10 mol % based on Ce. Analysis by X-ray diffractometry proved the cerium oxide to have a fluorite type superlattice structure and be represented by $CeO_{1.34}$. The cerium oxide had an average particle size of 2 μm.

The resulting cerium oxide having a fluorite type superlattice structure was treated directly with carbon dioxide. In detail, the temperature was raised from room temperature at a rate of 10° C./min up to 300° C., at which the system was maintained for 3 hours to cause carbon dioxide to obstruct at least part of the oxygen absorption sites of the cerium oxide. Thereafter, the temperature was dropped to room temperature, at which the product was taken out.

A 6 g portion of the resulting cerium oxide was mixed with the humidifier shown in Table 1 below in a mixing ratio shown. The mixture was sealed in a bag (casing) formed of a PET/paper/PE laminate sheet to give a dehumidifying and deoxidizing packet

TABLE 1

| | Dehumidifier | | |
|---|---|---|---|
| | Kind | Average Particle Size (μm) | Amount (g) |
| Example 1 | calcium oxide | 5 | 2.5 |
| Example 2 | naturally occurring zeolite | 100 | 2.5 |
| Example 3 | montmorillonite | 100 | 2.5 |
| Example 4 | silica gel | 1000 | 2.5 |

COMPARATIVE EXAMPLE 1

The cerium carbonate prepared in Example 1 was heated in the atmosphere at 1400° C. for 1 hour to obtain cerium oxide, which was then reduction fired in a 100% hydrogen flow (400 SCCM) at 1000° C. for 1 hour to obtain oxygen-deficient cerium oxide. The resulting cerium oxide was sealed in the same casing as used in Example 1.

Evaluation-1

A dehumidification test was carried on the dehumidifying and deoxidizing packets of Examples and Comparative Example according to the following procedure.

Figure 5:
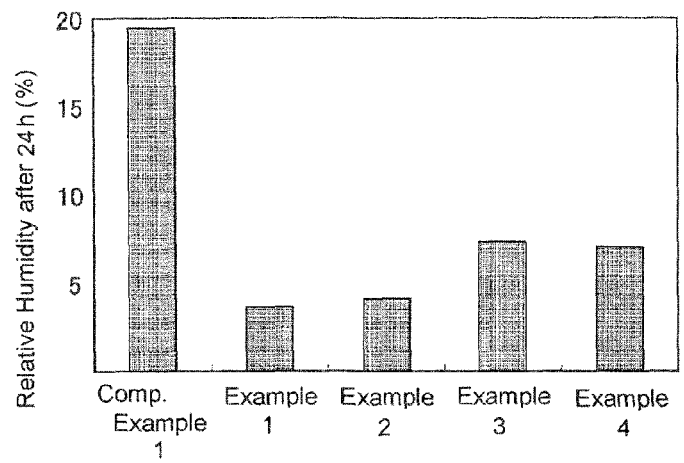
FIG. 5 is a graph showing the dehumidifying performance of the samples of Examples and Comparative Example.

A rubber sheet was stuck to the inner side of a bag made of gas barrier film. The probe of a thermo-hygrometer (HMI41 from Visala Inc.) was attached to the rubber sheet. Each of the packets of Examples and Comparative Example was put into the bag, and the bag was closed and evacuated. Three hundred milliliters of air adjusted to 25° C. and 60% RH in a constant temperature/humidity chamber was aspirated into a syringe and introduced into the bag. After 24 hours, the thermo-hygrometer was read to measure the change of humidity inside the bag. The results obtained are shown in FIG. 5. It is apparent from the results in FIG. 5 that the samples of Examples greatly decrease the inner humidity, whereas the humidity reduction by the comparative sample was small.

Evaluation-2 (Dehumidifying Performance in High Humidity Environment)

Figure 6:
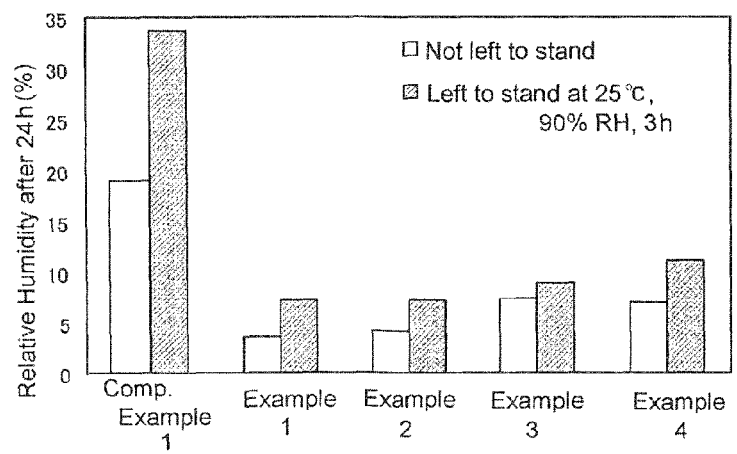
FIG. 6 is a graph showing the dehumidifying performance of the samples of Examples and Comparative Example after left to stand in a high humidity environment.

The samples of Examples and Comparative Example were allowed to stand at 25° C. and 90% RH for 3 hours and then evaluated in the same manner as described in evaluation-1. The results obtained are shown in FIG. 6 together with the results of FIG. 5. It is seen from the results in FIG. 6 that the reduction in dehumidifying performance after allowing to stand in a high humidity environment is smaller in Examples than in Comparative Example.

Evaluation-3 (Oxygen Absorbing Performance)

Figure 7:
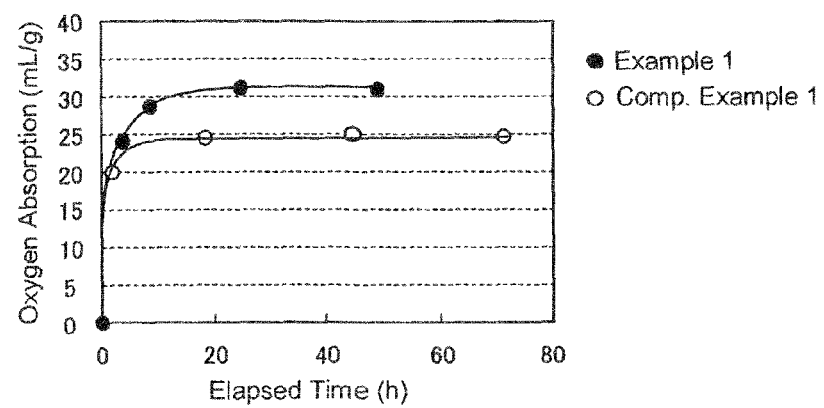
FIG. 7 is a graph showing the oxygen absorbing performance of the samples of Example 1 and Comparative Example 1.

The samples of Example 1 and Comparative Example 1 were evaluated for oxygen absorbing performance. The results obtained are shown in FIG. 7. The oxygen absorption of the sample of Comparative Example 1 reached saturation after an elapse of about 10 hours. The oxygen absorption was 25 ml/g. In contrast, the sample of Example 1 showed an increase of oxygen absorption even after an elapse of 10 hours and reached saturation after about 20 hours. The oxygen absorption was 32 ml/g.

INDUSTRIAL APPLICABILITY

As described in detail, the present invention enables dehumidification and deoxidization at the same time. The dehumidifying oxidizer of the invention exhibits remarkably enhanced dehumidifying performance in terms, e.g., of rate of dehumidification and the attainable lowest humidity as compared with oxygen-deficient cerium oxide used alone. Thus, the dehumidifying oxidizer of the invention is especially effective in dehumidifying and deoxidizing the environment surrounding articles that must be kept in a highly moisture-free environment. In particular, the dehumidifying deoxidizer of the invention experiences only small reduction in dehumidifying performance when left to stand in a high humidity environment. Furthermore, since the dehumidifying deoxidizer of the invention does not set off a metal detector, a package containing a food and the like together with the dehumidifying deoxidize is easy to inspect for foreign matter incorporation by use of a metal detector. Since the dehumidifying deoxidizer of the invention does not ignite when microwaved, it is safe to heat a package containing a food and the like together with the dehumidifying deoxidizer in a microwave oven, etc.

The invention claimed is:

1. A dehumidifying deoxidizer comprising:
   oxygen-deficient cerium oxide having a fluorite superlattice structure; and
   a dehumidifier,
   wherein the dehumidifier is composed of an inorganic material in a form of a powder having an average particle size of from 0.1 µm to 1 mm.

2. The dehumidifying deoxidizer according to claim 1, wherein the oxygen-deficient cerium oxide is doped with a dopant element which increases the oxygen absorption of the cerium oxide.

3. The dehumidifying deoxidizer according to claim 1, wherein a proportion of the dehumidifier is 1% to 50%, based upon a total weight of the cerium oxide and the dehumidifier.

4. The dehumidifying deoxidizer according to claim 1, wherein a proportion of the dehumidifier is 15% to 40%, based upon a total weight of the cerium oxide and the dehumidifier.

5. The dehumidifying deoxidizer according to claim 1, wherein the cerium oxide and the dehumidifier have an average particle size of 0.1 µm to 100 µm and 0.1 µm to 1 mm, respectively.

6. The dehumidifying deoxidizer according to claim 1, wherein the inorganic dehumidifier is selected from the group consisting of naturally occurring zeolite, mordenite, clinoptilolite, erionite, synthetic zeolite, molecular sieve, clay minerals, bentonite, montmorillonite, silica gel, alumina, calcium oxide, and hygroscopic salts.

7. A dehumidifying and deoxidizing packet comprising a bag-shaped, gas permeable casing and the dehumidifying deoxidizer according to claim 1 sealed in the casing.

8. A dehumidifying and deoxidizing resin composition comprising the dehumidifying deoxidizer according to claim 1 and a gas permeable resin.

9. The dehumidifying and deoxidizing resin composition according to claim 8, which has the form of a pellet, film or a tray.

10. A dehumidifying and deoxidizing laminate film comprising a dehumidifying and deoxidizing layer having the dehumidifying and deoxidizing resin composition according to claim 8, a gas barrier layer which has gas barrier properties and is superposed on one side of the dehumidifying and deoxidizing layer, and a gas permeable layer which has gas permeability and is superposed on the other side of the dehumidifying and deoxidizing layer.

11. The dehumidifying and deoxidizing laminate film according to claim 10, further comprising a buffer layer having a buffering action against a physical impact between the dehumidifying and deoxidizing layer and the gas barrier layer, and a high gas barrier layer on the outer side of the gas barrier layer, the high gas barrier layer having higher ability to block the penetration of oxygen and moisture than the gas barrier layer.

12. A dehumidifying deoxidizer comprising:
    oxygen-deficient cerium oxide; and
    a dehumidifier,
    wherein the oxygen-deficient cerium oxide has an oxygen absorption site caused by the oxygen vacancy, the oxygen absorption site being releasably obstructed by a site obstructing factor.

13. The dehumidifying deoxidizer according to claim 12, wherein the oxygen-deficient cerium oxide is doped with a dopant element which increases the oxygen absorption of the cerium oxide.

14. The dehumidifying deoxidizer according to claim 12, wherein the oxygen-deficient cerium oxide has a fluorite superlattice structure.

15. A dehumidifying and deoxidizing packet comprising a bag-shaped, gas permeable casing and the dehumidifying deoxidizer according to claim 12 sealed in the casing.

16. A dehumidifying and deoxidizing resin composition comprising the dehumidifying deoxidizer according to claim 12 and a gas permeable resin.

17. The dehumidifying and deoxidizing resin composition according to claim 16, which has the form of a pellet, film or a tray.

18. A dehumidifying and deoxidizing laminate film comprising a dehumidifying and deoxidizing layer having the dehumidifying and deoxidizing resin composition according to claim 16, a gas barrier layer which has gas barrier properties and is superposed on one side of the dehumidifying and deoxidizing layer, and a gas permeable layer which has gas permeability and is superposed on the other side of the dehumidifying and deoxidizing layer.

19. The dehumidifying and deoxidizing laminate film according to claim 18, further comprising a buffer layer having a buffering action against a physical impact between the dehumidifying and deoxidizing layer and the gas barrier layer, and a high gas barrier layer on the outer side of the gas barrier layer, the high gas barrier layer having higher ability to block the penetration of oxygen and moisture than the gas barrier layer.

* * * * *